Aug. 18, 1953 R. K. LOCKHART 2,649,555
TELEVISION RASTER SHAPE CONTROL SYSTEM
Filed Sept. 4, 1951
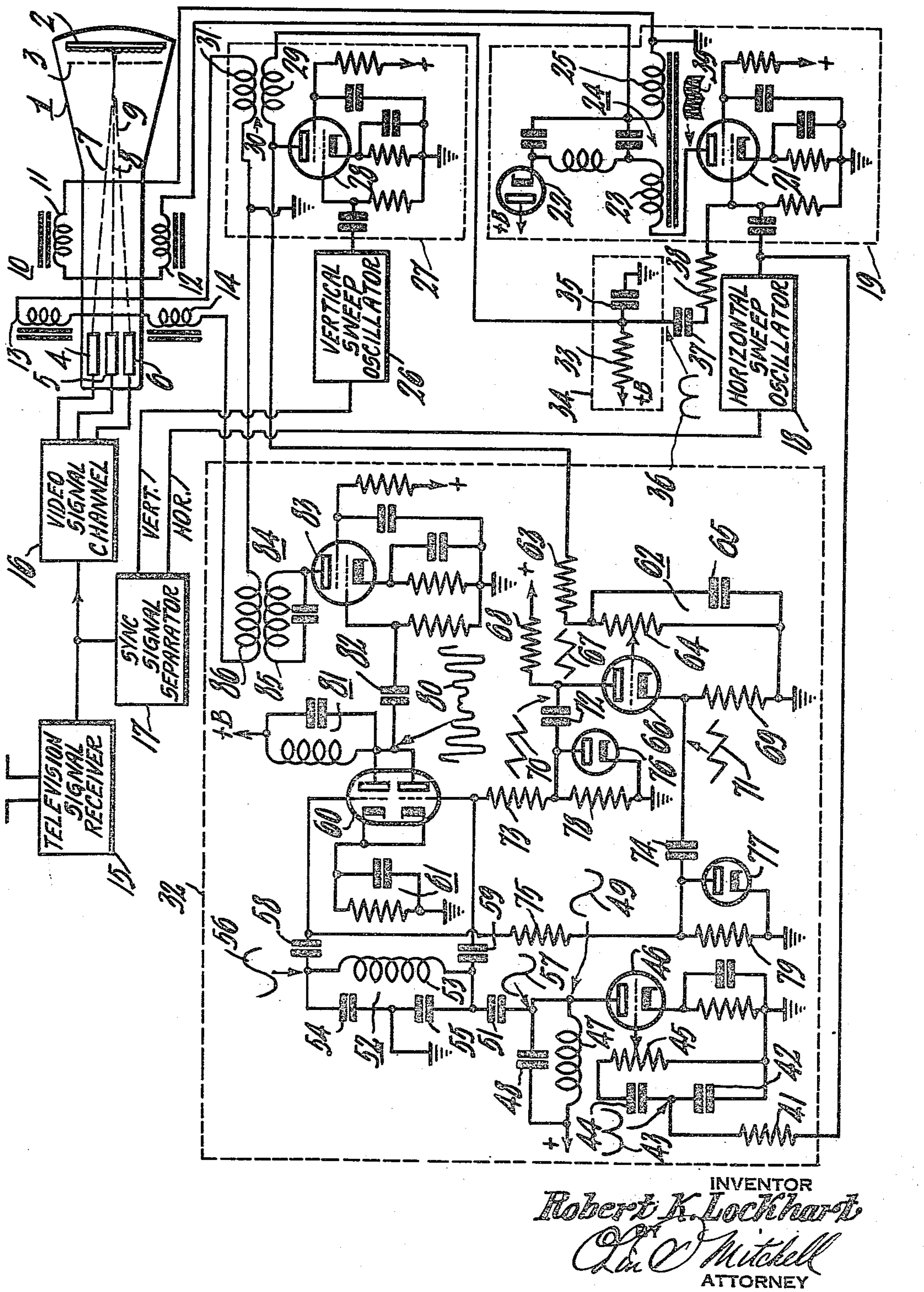
INVENTOR
Robert K. Lockhart
BY
Olin S. Mitchell
ATTORNEY Patented Aug. 18, 1953

2,649,555

UNITED STATES PATENT OFFICE 2,649,555

TELEVISION RASTER SHAPE CONTROL SYSTEM

Robert K. Lockhart, Moorestown, N. J., assignor to Radio Corporation of America, a corporation of Delaware Application September 4, 1951, Serial No. 244,877

11 Claims. (Cl. 315—24)

This invention relates to systems and apparatus for deflecting an electron beam of a cathode ray tube and has particular reference to systems for energizing the deflection apparatus so as to scan a substantially rectangular raster at the target electrode of the tube.

In many types of cathode ray tubes, it is desired to deflect an electron beam over a target electrode in such a manner as to scan a substantially rectangular raster. Where the target electrode has a curved configuration of such a character that its center of curvature is not appreciably different from the point about which the electron beam is deflected and when the angle of deflection is relatively small, a substantially rectangular raster may be scanned with apparatus which may be uniformly energized. However, where the cathode ray tube is of the type where the target electrode is relatively flat and the deflection angle is large it ordinarily is difficult to scan a raster at the target electrode which is rectangular. This is particularly true where the deflecting field is required to be essentially uniform throughout. In such a case, the raster has a shape which has a deformation generally known as "pin-cushion" distortion.

It is an object of the present invention to provide an improved system for energizing the deflection apparatus of a cathode ray tube in a novel manner so as to control, to a certain degree, the shape of the raster scanned at a relatively flat target electrode by means of a substantially uniform deflecting field.

Another object of the invention is to provide an improved system for energizing the deflection apparatus of a cathode ray tube so as to eliminate, or at least to minimize, the pin-cushion type of raster distortion produced under certain conditions.

Still another object of the invention is to provide an improved system for energizing the deflection apparatus of a cathode ray tube so as to eliminate pin-cushion distortion of the raster scanned upon a relatively flat target electrode under the control of a substantially uniform deflecting field.

A further object of the invention is to provide an improved system for energizing the deflection apparatus of a cathode ray tube by means of a wave having a periodicity at one of the deflecting frequencies and having a component which varies as a function of the other deflecting frequency.

In accordance with the invention, there is provided a system for energizing the deflection apparatus of a cathode ray tube in such a manner as to deflect an electron beam suitably to scan a substantially rectangular raster at a target electrode of the tube and which utilizes deflection waves at horizontal and vertical scanning frequencies modified by components varying, respectively, as functions of the other scanning frequencies. The apparatus includes horizontal and vertical deflection wave generators coupled, respectively, to the horizontal and vertical windings of the deflection yoke. A component of the vertical deflection wave is derived from the vertical generator and is suitably shaped for impression upon the horizontal generator so as to produce a horizontal deflection wave having a component varying at the vertical deflection frequency. The vertical sides of the raster scanned by the electron beam may be straightened by such a composite horizontal deflection wave. Also, a wave component is produced with variations at both the vertical and horizontal deflection frequencies and is added to the vertical deflection wave for impression upon the vertical windings of the yoke. The magnetic field produced by the vertical windings energized by such a wave deflects an electron beam so as to straighten the top and bottom portions of the scanned raster.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram, partly in block form, of a television signal-receiving and image-reproducing system embodying the invention.

The illustrated form of the invention is a color television system in which a multicolor kinescope having a plurality of electron beams is employed. In the drawing, the color kinescope 1 represents one form of a cathode ray tube with which the present invention may be employed. The kinescope 1 is of the general type described in an article titled "General description of receivers for the RCA color television system which employ direct-view tri-color kinescopes" published in the RCA Review, volume XI, No. 2, June 1950 at pages 228 to 232. Such a tube also forms the subject matter of a copending application of Alfred C. Schroeder, Serial No. 730,637, filed February 24, 1947 and titled "Picture Reproducing Apparatus," now Patent No. 2,595,548, granted May 6, 1952. This tube is provided with a substantially flat luminescent screen 2 having a multiplicity of small phosphor areas arranged in groups and capable, respectively, of producing light of the different primary colors in which the image is to be reproduced when excited by an electron beam. In back of, and spaced from, the screen 2 there is an apertured masking electrode 3 having an aperture for, and in alignment with, each group of phosphor areas of the screen 2. The kinescope also has a plurality of electron guns equal in number to the number of primary colors in which the image is to be reproduced. In the usual three-color television system where the primary colors are red, green and blue, the multicolor kinescope is provided with three electron guns such as diagrammatically represented at 4, 5 and 6 for producing electron beams 7, 8 and 9 by which to energize the red, green and blue phosphor areas of the screen 2. The electron beams, travelling different paths from their respective guns, are suitably controlled by conventional apparatus (not shown) so that they converge substantially in the plane of the masking electrode 3. Accordingly, all three of the electron beams 7, 8 and 9 pass through the apertures of the masking electrode from different directions and impinge upon different phosphor areas of the groups so as to produce red, green and blue light.

The color kinescope 1 also is provided with a deflection yoke 10 for deflecting the electron beams 7, 8 and 9 over the target electrode structure which, for the purpose of the present invention, may be considered as including the luminescent screen 2 and apertured masking electrode 3. Such deflection of the beams over the target electrode structure is for the purpose of scanning the usual raster for image-reproducing purposes. The deflection yoke includes horizontal and vertical field-producing components such as the coils or windings 11—12 and 13—14, respectively. It will be understood that the coils of the deflection yoke are of the usual form and are illustrated in a diagrammatic manner in the drawing primarily for the purpose of more clearly illustrating the invention.

In the present case where the deflection yoke is required to effect deflection of a plurality of electron beams traversing the magnetic field produced by the yoke in spaced paths, it is necessary that the yoke be of such a character that the magnetic field is uniform in intensity throughout substantially the entire deflection region. This is necessary in order that all of the electron beams 7, 8 and 9 be similarly deflected throughout the entire raster to be scanned at the target electrode. The fulfilment of this requirement and also the fact that the electron beams are required to scan a raster at a relatively flat target electrode and through appreciable deflection angles results in an undesired pincushion distortion of the scanned raster. It is the purpose of this invention to effect some correction of the distorted raster shape.

The television system in which the invention is embodied also includes a conventional television signal receiver 15 from which it will be understood is derived a composite television signal. This composite television signal includes video and system control signals such as the horizontal and vertical synchronizing pulses. The composite signal derived from the receiver 15 is impressed by way of a video signal channel 16 upon the electron beam control apparatus including the guns 4, 5 and 6 of the color kinescope. In this connection, it will be understood that the red, green and blue video signals which are impressed upon the guns 4, 5 and 6 effect the intensity modulation of the electron beams 7, 8 and 9, respectively, in accordance with the red, green and blue video signals representing the image to be reproduced. Also, the composite television signal derived from the receiver 15 is impressed upon a sync signal separator 17 which may be of conventional design. Accordingly, it will be understood that the sync signal separator functions to separate the horizontal and vertical synchronizing pulses from the video signals and also from one another.

The horizontal synchronizing pulses derived from the sync signal separator 17 are impressed upon a horizontal sweep oscillator 18 which may be conventional and will be understood to develop a substantially sawtooth wave at the horizontal deflection frequency. The horizontal sawtooth wave derived from the oscillator 18 is impressed upon a horizontal output stage 19. This latter apparatus also may be conventional and in one of the forms, particularly as shown in Figure 19, in an article titled "Television deflection circuits" by A. W. Friend, published in RCA Review, March 1947, vol. VIII, No. 1. The horizontal output stage 19 includes an electron tube 21 deriving its space current from a suitable source indicated at +B through a damper diode tube 22 and a winding 23 of an output transformer 24. Another winding 25 of the output transformer is coupled to the horizontal winding 11—12 of the deflection yoke 10.

The vertical synchronizing pulses derived from the sync signal separator 17 are impressed upon a vertical sweep oscillator 26 which may be conventional in design and functions to produce a substantially sawtooth wave at the vertical deflection frequency. The vertical sawtooth wave is impressed upon a vertical output stage 27 which generally is of a conventional character. The vertical output stage includes an electron tube 28 having an output circuit which is coupled to its anode. The output circuit includes a primary winding 29 of an output transformer 30. The secondary winding 31 of the vertical output transformer is coupled to the vertical deflection windings 13—14 of the yoke 10 and also to an auxiliary wave developing apparatus 32 embodying apparatus in accordance with this invention to be described subsequently.

For the purpose of straightening the vertical sides of the raster scanned by the electron beams 7, 8 and 9, of the kinescope 1, the wave which is impressed upon the horizontal windings 11—12 of the yoke 10 has a substantially sawtooth form at the horizontal deflection frequency and also a component varying as a function of the vertical deflection frequency. In order to produce such a wave, the space current for the vertical output tube 28 is derived from a source indicated at +B through a resistor 33 forming one element of a wave-shaping network 34. A capacitor 35 connected between the resistor 33 and ground forms the other component of the wave-shaping network. This network is of a character to integrate a sample of the space current of the vertical output tube 28 so as to form a substantially parabolic wave 36 having the vertical deflection frequency. The wave 36 is impressed by a coupling capacitor 37 and a series resistor 38 upon the input circuit of the horizontal output tube 21. By this means, the energy which is supplied to the horizontal windings 11—12 of the deflection yoke 10 is modulated at a vertical rate as illustrated by the curve 39. As a result, there is effected a size modulation of the scanned raster of such a character that the width of the raster is reduced at the top and bottom relative to the central portion thereof. Correction of pin-cushion distortion of the sides of the scanned raster thereby is effected.

In order to correct for the pin-cushion distortion occurring at the top and bottom of the scanned raster, the horizontal sawtooth wave derived from the oscillator 18 is impressed upon a first input circuit of the auxiliary wave-developing apparatus 32. This input circuit comprises a wave-shaping network and including a resistor 41 and a capacitor 42 by which to produce a parabolic wave 43. The wave 43 is impressed by a coupling capacitor 44 and a variable resistor 45 upon the grid of a wave-reforming electron tube 46. The anode circuit of the tube 46 is provided with a load comprising a parallel resonant circuit including an inductor 47 and a capacitor 48 so as to develop a substantially sinusoidal wave 49 at the horizontal deflection frequency.

The sinusoidal wave 49 is impressed by a coupling capacitor 51 upon a tuned circuit 52 comprising an inductor 53 and capacitors 54 and 55 coupled respectively between terminals of the inductor and ground. The tuned circuit 52 is essentially a phase-splitting network and operates to separate the sine wave into two wave energy components of opposite phases and represented by the curves 56 and 57.

Coupling capacitors 58 and 59 connected respectively to the terminals of the phase-splitting network 52 impress the two opposite phase components 56 and 57 of the sinusoidal wave upon the control grids of a duel triode electron tube 60 constituting a pair of electronic modulating devices. The cathodes of the tube 60 are connected together and through a self-biasing network 61 to ground. There also is impressed upon the control grids of the tube 60 sawtooth waves of opposite phases at the vertical deflection frequency.

The sawtooth waves which are impressed upon the grids of the tube 60 are derived from a second input circuit of the auxiliary wave-developing apparatus 32 which is connected to the anode of the vertical output tube 28. This input circuit comprises a network 62 including resistors 63 and 64 and a capacitor 65. A selected point on the resistor 64 is coupled to the control grid of a phase-splitting tube 66 for the impression thereon of the vertical sawtooth wave 67. The anode of this tube is connected through a load resistor 68 to a source of positive potential and the cathode is connected through a substantially equal load resistor 69 to ground. Opposite phase components 70 and 71 of the vertical sawtooth wave are impressed by capacitive-resistive coupling circuits 72—73 and 74—75, respectively, upon the control grids of the tube 60 to effect the biasing of the two sections of this tube in a manner to be described. The sawtooth wave voltages 70 and 71 are clamped to ground level by diodes 76 and 77, respectively. The diodes are shunted by resistors 78 and 79, respectively.

By means of the sawtooth wave voltages 70 and 71, the two sections of the modulating tube 60 are rendered alternately conductive. As illustrated in the drawing, the sawtooth wave 71 biases the grid of the upper section of the tube 60 so that this section is conductive during the first half of a field and is non-conducting during the second half. The sawtooth wave 70 controls the operation of the lower half of the tube 60 so that it is non-conductive during the first half of a field and is conductive during the second half. As a consequence of the alternate conductive operation of the two sections of the tube 60 under the control of the sawtooth waves 70 and 71 at the vertical deflection frequency and the concurrent impression upon the control grids thereof of the out-of-phase sinusoidal waves 56 and 57 at the horizontal deflection frequency, a resultant wave 80 is produced in the output circuit of the tube. This wave is developed at the interconnected anodes of the modulating tube 60 which are connected by a load circuit 81, tuned substantially to the horizontal deflection frequency, to a suitable source of positive potential. It will be appreciated that the resultant wave 80 is a substantially sinusoidal wave at the horizontal deflection frequency which, during the first half of a cycle corresponding to the period of one field, has a predetermined phase. The amplitude of this wave decreases substantially linearly to zero at a time corresponding substantially to the midpoint of the field. From this point, the amplitude of the sinusoidal wave increases linearly so that it reaches full amplitude at the end of the field. However, the phase of the increasing amplitude sinusoidal wave is 180 degrees displaced from that of the decreasing amplitude wave occurring during the first half of the field.

The output circuit of the modulating tube 60 is coupled by means including a capacitor 82 to the input circuit of an amplifier tube 83. An amplified equivalent of the wave 80 is developed in the output circuit of the tube 83. This output circuit includes a load network 84 connected between the anode of the tube and a suitable source of positive potential and is tuned for resonance at the horizontal deflection frequency.

The inductor 85 of the resonant load circuit 84 forms the primary winding of an output transformer which also is provided with a secondary winding 86 forming the output circuit of the auxiliary wave-developing apparatus 32. The secondary winding is connected in series with the secondary winding 31 of the vertical output transformer 30 and the two windings are connected to the vertical deflection windings 13—14 of the yoke 10. By means of the described interconnection of the vertical output stage 27 and the output circuit of the wave-developing apparatus 32, the vertical yoke windings are energized by a composite wave including the usual vertical sawtooth wave and a substantially sinusoidal wave at horizontal deflection frequency having a linearly varying amplitude at the vertical deflection frequency and a phase reversal at twice the field frequency.

By this means, the magnetic field produced by the vertical yoke windings is dynamically varied in such a manner to correct any pin-cushion ditortion of the raster scanned at the target electrode in the horizontal portions of the raster. The resultant current through the vertical yoke windings produced in the manner described may be adjusted in magnitude and in phase in such a manner that the height of the raster is reduced at both the left and right hand regions thereof and is increased in the center, thereby eliminating the pin-cushioning. Adjustments of the character described may be made by suitable manipulation of components such as the variable resistors 45 associated with the tube 46 and 64 associated with the tube 66.

From the foregoing description of an illustrative embodiment of the invention, it may be seen that there is provided a system for energizing the deflection apparatus of a cathode ray tube in such a manner that pin-cushion distortion of the raster scanned may be substantially completely eliminated or at least minimized. It also will be appreciated that distortion of the character described may be eliminated in either one or both of the dimensions of the raster. The system embodies apparatus which operates to produce components of the deflection waves impressed upon the windings of the yoke which have a periodicity at one of the deflection frequencies and a component which varies as a function of the other deflection frequency.

It will be understood that the present invention is not necessarily limited for use with cathode ray tubes such as the particular multicolor kinescope illustratively disclosed herein. It is apparent that the invention may be employed to produce beneficial results in other types of cathode ray apparatus such as, for example, a single beam black and white kinescope in which the beam is deflected through a comparatively larglе angle to scan a raster at a relatively flat target electrode.

From the foregoing description the nature of the invention may be determined. Its scope is pointed out in the appended claims.

What is claimed is:

1. A system for energizing deflection apparatus of a cathode ray tube to deflect an electron beam suitably to scan a roster of predetermined shape at a target electrode of said tube comprising, horizontal and vertical sawtooth deflection wave generators coupled respectively to horizontal and vertical beam-deflecting field-producing components of said deflection apparatus, means including a wave-shaping network coupling the output of said vertical deflection wave generator and the input of said horizontal deflection wave generator to modulate said horizontal sawtooth wave energy as a function of said vertical deflection frequency, correcting wave-developing apparatus having two input circuits and an output circuit, means coupling said input circuits respectively to said horizontal and vertical deflection wave generators, said correcting wave-developing apparatus operating to develop in said output circuit a correcting wave at horizontal deflection frequency varying in amplitude at vertical deflection frequency from a maximum to a minimum in a first interval and from a minimum to a maximum in a succeeding second interval, said correcting wave having opposite phases in said two intervals, and means coupling said output circuit to said vertical beam-deflecting field-producing component.

2. A system for energizing deflection apparatus of a cathode ray tube as defined in claim 1 wherein, said correcting wave-developing apparatus comprises, means including a wave-shaping network to convert said horizontal sawtooth wave energy into substantially sinusodial wave energy at horizontal deflection frequency, whereby to develop in said output circuit a correcting wave having a substantially sinusodial form.

3. A system for energizing deflection apparatus of a cathode ray tube as defined in claim 1 wherein, said correcting wave-developing apparatus comprises, means including a phase-splitting network for producing horizontal wave energy in two opposite phases.

4. A system for energizing deflection apparatus of a cathode ray tube as defined in claim 1 wherein, said correcting wave-developing apparatus comprises, means for converting said horizontal sawtooth wave energy to wave energy of a different form, and means controlled by said vertical sawtooth wave energy to amplitude modulate said reformed horizontal wave energy.

5. A system for energizing deflection apparatus of a cathode ray tube as defined in claim 1 wherein, said correcting wave-developing apparatus comprises, means coupled to one of said input circuits to produce wave energy components of opposite phases at horizontal deflection frequency, and means coupled to the other of said input circuits to amplitude modulate one of said wave energy components in one sense and the other of said wave energy components in an opposite sense.

6. A system for energizing deflection apparatus of a cathode ray tube to deflect an electron beam suitably to scan a raster of predetermined shape at a target electrode of said tube comprising, horizontal and vertical sawtooth deflection generators coupled respectively to horizontal and vertical beam-deflecting field-producing components of said deflection apparatus, each of said generators including an output electron tube, and means including a wave-shaping network coupling the output tube of said vertical deflection generator to the output tube of said horizontal deflection generator to modulate said horizontal sawtooth wave energy as a function of said vertical deflection frequency, whereby to correct pincushion distortion of the sides of said scanned raster.

7. A system for energizing deflection apparatus of a cathode ray tube as defined in claim 6 wherein, said wave-shaping network is coupled to an output electrode of said vertical deflection generator output tube and also to an input electrode of said horizontal deflection generator output tube.

8. A system for energizing deflection apparatus of a cathode ray tube as defined in claim 6 wherein, said wave-shaping network is of a charactor to integrate sawtooth wave energy derived from said vertical deflection generator so as to form a substantially parabolic wave at said vertical deflection frequency.

9. A system for energizing deflection apparatus of a cathode ray tube to deflect an electron beam suitably to scan a raster of predetermined shape at a target electrode of said tube comprising, horizontal and vertical sawtooth deflection wave generators coupled respectively to horizontal and vertical beam-deflecting field-producing components of said deflection apparatus, an auxiliary correcting wave-developing apparatus having two input circuits and an output circuit, means coupling said input circuits respectively to said horizontal and vertical deflection wave generators, said correcting wave-developing apparatus including means operating to develop in said output circuit a correcting wave at horizontal deflection frequency varying in amplitude at vertical deflection frequency from a maximum to a minimum in a first interval and from a minimum to a maximum in a suceeding second interval, said correcting wave having opposite phases in said two intervals, and means coupling said output circuit to said vertical beam deflecting field-producing component, whereby to correct pin-cushion distortion of the top and bottom of said scanned raster.

10. A system for energizing deflection apparatus of a cathode ray tube as defined in claim 9 wherein, one of said input circuits includes a wave-shaping network by which to convert said horizontal sawtooth wave energy into substantially parabolic form, said correcting wave-developing apparatus comprising, means including a wave-reforming electron tube coupled to said wave-shaping network to develop a substantially sinusoidal wave at horizontal deflection frequency, a phase-splitting network coupled to said wave-reforming tube to produce sinusoidal waves at horizontal deflection frequency of opposite phases, the other of said input circuits including phase-splitting apparatus having an electron tube coupled to said vertical deflection wave generator, and a pair of electronic modulating devices coupled respectively to said sinusoidal wave phase-splitting network and also to said vertical sawtooth phase-splitting apparatus to develop said amplitude modulated correcting wave in said output circuit.

11. A system for energizing deflection apparatus of a cathode ray tube to deflect an electron beam suitably to scan a substantially rectangular raster at a target electrode of said tube comprising, horizontal and vertical sawtooth deflection wave generators coupled respectively to horizontal and vertical beam-deflecting field-producing components of said deflection apparatus, each of said generators including an output electron tube, means including a first wave-shaping network coupling an output electrode of said vertical deflection generator output tube and an input electrode of said horizontal deflection generator output tube, said first wave-shaping network being of a character to integrate sawtooth wave energy derived from said vertical deflection generator so as to form a substantially parabolic wave at vertical deflection frequency, whereby to modulate said horizontal sawtooth wave energy as a parabolic function at said vertical deflection frequency, an auxiliary correcting wave-developing apparatus having two input circuits and an output circuit, a second wave-shaping network included in one of said input circuits coupled to said horizontal deflection wave generator to integrate sawtooth wave energy so as to form a substantially parabolic wave at horizontal deflection frequency, a wave-reforming electron tube coupled to said second wave-shaping network to develop a substantially sinusoidal wave at horizontal deflection frequency, a phase-splitting network coupled to said wave-reforming tube to produce sinusoidal wave components of opposite phases at horizontal deflection frequency, phase-splitting apparatus including an electron tube coupled to said vertical deflection wave generator to produce sawtooth wave components of opposite phases at vertical deflection frequency, a pair of electronic modulating devices having input circuits coupled respectively to opposite phase points of said sinusoidal wave-splitting network and also to opposite phase points of said sawtooth wave-splitting apparatus and a common output circuit in which to develop a substantially sinusoidal correcting wave at horizontal deflection frequency varying substantially linearly in amplitude at vertical deflection frequency from a maximum to a minimum in a first half-field interval and from a minimum to a maximum in a succeeding second half-field interval, said correcting wave having opposite phases in said two intervals, and means coupling said common modulator output circuit to said vertical beam-deflecting field-producing component.

ROBERT K. LOCKHART.

References Cited in the file of this patent

UNITED STATES PATENTS

| Number | Name | Date |
|---|---|---|
| 2,421,521 | Poch | June 3, 1947 |
| 2,449,524 | Witherby | Sept. 14, 1948 |
| 2,574,946 | White | Nov. 13, 1951 |